United States Patent
Laghate et al.

(10) Patent No.: US 11,632,741 B2
(45) Date of Patent: Apr. 18, 2023

(54) REDUCING NUMBER OF ANTENNA ELEMENTS FOR UPLINK TRANSMISSION

(71) Applicant: QUALCOMM Incorporated, San Diego, CA (US)

(72) Inventors: Mihir Vijay Laghate, San Diego, CA (US); Ruhua He, San Diego, CA (US); Junsheng Han, Sunnyvale, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/134,439

(22) Filed: Dec. 27, 2020

(65) Prior Publication Data

US 2021/0204251 A1     Jul. 1, 2021

Related U.S. Application Data

(60) Provisional application No. 62/954,103, filed on Dec. 27, 2019.

(51) Int. Cl.
| | |
|---|---|
| *H04W 72/02* | (2009.01) |
| *H04W 52/08* | (2009.01) |
| *H04W 72/044* | (2023.01) |
| *H04W 72/04* | (2023.01) |
| *H04W 72/08* | (2009.01) |

(52) U.S. Cl.
CPC ........... *H04W 72/02* (2013.01); *H04W 52/08* (2013.01); *H04W 72/044* (2013.01); *H04W 72/0413* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 2013/0010720 A1* | 1/2013 | Lohr | H04L 5/0057 370/329 |
| 2018/0027585 A1* | 1/2018 | Guo | H04W 72/048 370/336 |
| 2018/0167897 A1* | 6/2018 | Sampath | H04W 52/365 |
| 2019/0037560 A1* | 1/2019 | Huang | H04W 52/365 |
| 2019/0104477 A1* | 4/2019 | MolavianJazi | H04L 5/0051 |
| 2019/0349862 A1* | 11/2019 | Akkarakaran | H04W 52/365 |
| 2019/0394732 A1* | 12/2019 | Loehr | H04L 25/0224 |
| 2020/0145080 A1* | 5/2020 | Tang | H04W 24/10 |
| 2021/0021325 A1* | 1/2021 | Davydov | H04B 7/0695 |

* cited by examiner

*Primary Examiner* — Kodzovi Acolatse
(74) *Attorney, Agent, or Firm* — Qualcomm Incorporated

(57) ABSTRACT

Certain aspects of the present disclosure provide techniques for reducing a quantity of antenna elements for uplink transmission. A method that may be performed by a user equipment (UE) includes determining a virtual power headroom (VPHR) associated with uplink transmission for each of a plurality of beams, selecting one or more beams of the plurality of beams for the uplink transmission based on the determination such that the VPHR associated with each of the one or more beams is at least equal to or greater than zero, and indicating a parameter associated with the one or more beams for selection of a beam to be used for the uplink transmission.

30 Claims, 7 Drawing Sheets

REDUCING NUMBER OF ANTENNA ELEMENTS FOR UPLINK TRANSMISSION

PRIORITY CLAIM

This application claims benefit of priority to U.S. Provisional Application No. 62/954,103, filed on Dec. 27, 2019, which is expressly incorporated by reference in its entirety as if fully set forth below and for all applicable purposes.

BACKGROUND

Field of the Disclosure

Aspects of the present disclosure relate to wireless communications, and more particularly, to techniques for beam selection.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In order to assist a base station to schedule/allocate uplink resources to different UEs, a UE may report its available power headroom to the base station. The base station may use power headroom reports to determine how much uplink bandwidth per subframe each UE may use. This may help to avoid allocating uplink transmission resources to UEs which are unable to properly use them.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects provide a method for wireless communication at a user-equipment (UE). The method generally includes determining a virtual power headroom (VPHR) associated with uplink transmission for each of a plurality of beams, selecting one or more beams of the plurality of beams for the uplink transmission based on the determination such that the VPHR associated with each of the one or more beams is at least equal to or greater than zero, and indicating a parameter associated with the one or more beams for selection of a beam to be used for the uplink transmission.

Certain aspects provide an apparatus for wireless communication at a UE. The apparatus generally includes a memory, and a processing system coupled to the memory and configured to determine a VPHR associated with uplink transmission for each of a plurality of beams, select one or more beams of the plurality of beams for the uplink transmission based on the determination such that the VPHR associated with each of the one or more beams is at least equal to or greater than zero, and indicate a parameter associated with the one or more beams for selection of a beam to be used for the uplink transmission.

Certain aspects provide an apparatus for wireless communication at a UE. The apparatus generally includes means for determining a VPHR associated with uplink transmission for each of a plurality of beams, means for selecting one or more beams of the plurality of beams for the uplink transmission based on the determination such that the VPHR associated with each of the one or more beams is at least equal to or greater than zero, and means for indicating a parameter associated with the one or more beams for selection of a beam to be used for the uplink transmission.

Certain aspects provide a computer readable medium. The computer readable medium generally includes code stored thereon to cause one or more processors to determine a VPHR associated with uplink transmission for each of a plurality of beams, select one or more beams of the plurality of beams for the uplink transmission based on the determination such that the VPHR associated with each of the one or more beams is at least equal to or greater than zero, and indicate a parameter associated with the one or more beams for selection of a beam to be used for the uplink transmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for beam selection. For example, certain aspects provide techniques for selecting a beam for uplink based on virtual power head (VPHR) estimation such that the VPHR corresponding to the beam is greater than zero. VPHR generally refers to a difference between an estimated receive power of a transmission at a base station and a target receive power of the transmission at the base station. One or more beams may be candidates for uplink transmission even though the VPHR of the beams are not at maximum across all available beams, increasing the quantity of candidate beams for uplink transmission to implement a more efficient communication system.

The following description provides example techniques for beam selection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
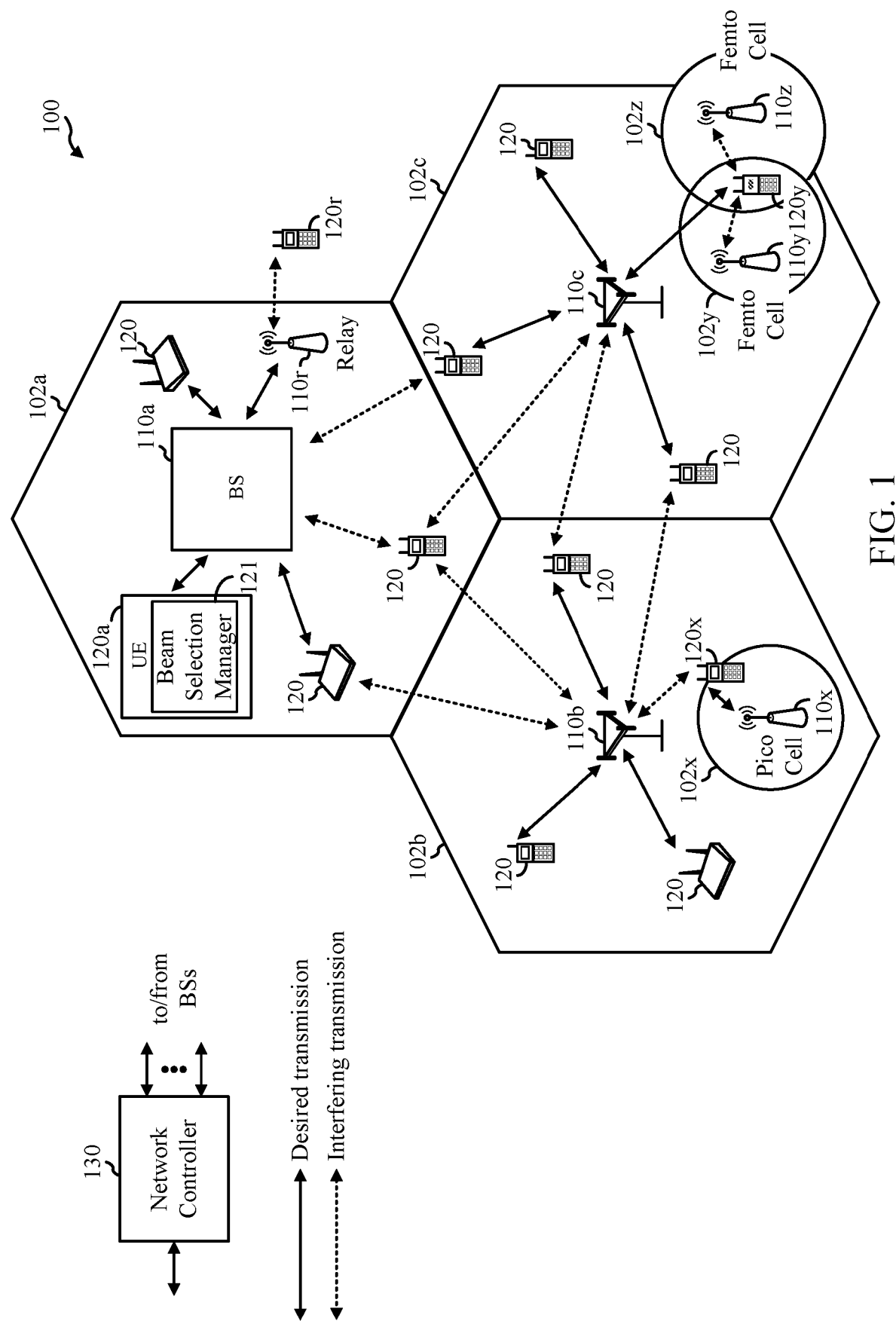
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for beam selection. As shown in FIG. 1, the UE 120a includes a beam selection manager 121. The beam selection manager 121 may be configured to select a beam for uplink signaling, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
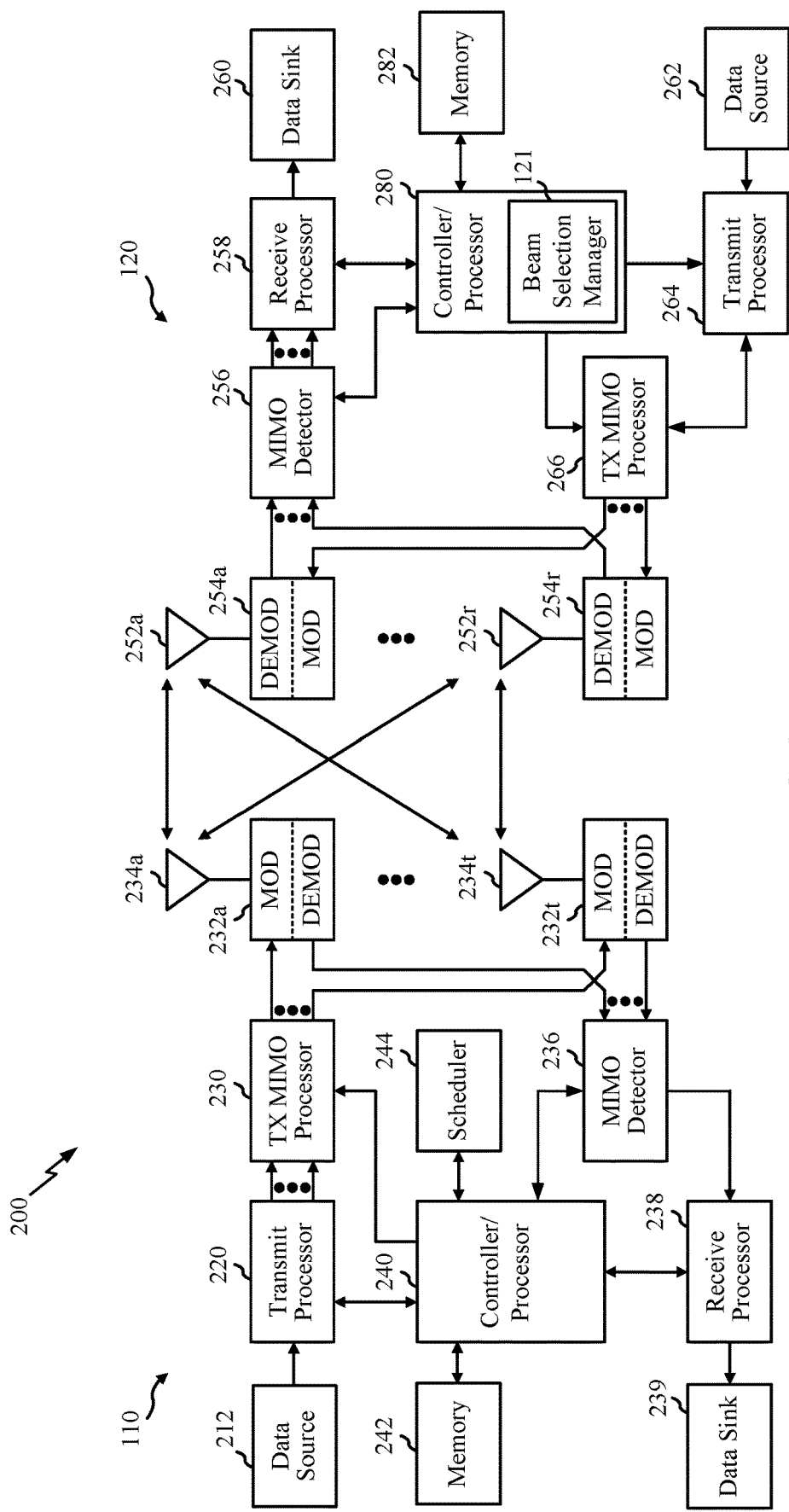
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The processor 220 may process (e.g., encode and symbol map) the data and control information to obtain data symbols and control symbols, respectively. The transmit processor 220 may also generate reference symbols. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data from a data source 262 and control information from the controller/processor 280. The transmit processor 264 may also generate reference symbols for a reference signal. The symbols from the transmit processor 264 may be precoded by a TX MIMO processor 266 if applicable, further processed by the demodulators in transceivers 254a-254r, and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a beam selection manager 121 that may be configured for performing operations for selecting a beam for uplink signaling, according to aspects described herein. Although shown at the Controller/Processor, other components of the UE 120a and BS 110a may be used performing the operations described herein.

Figure 3:
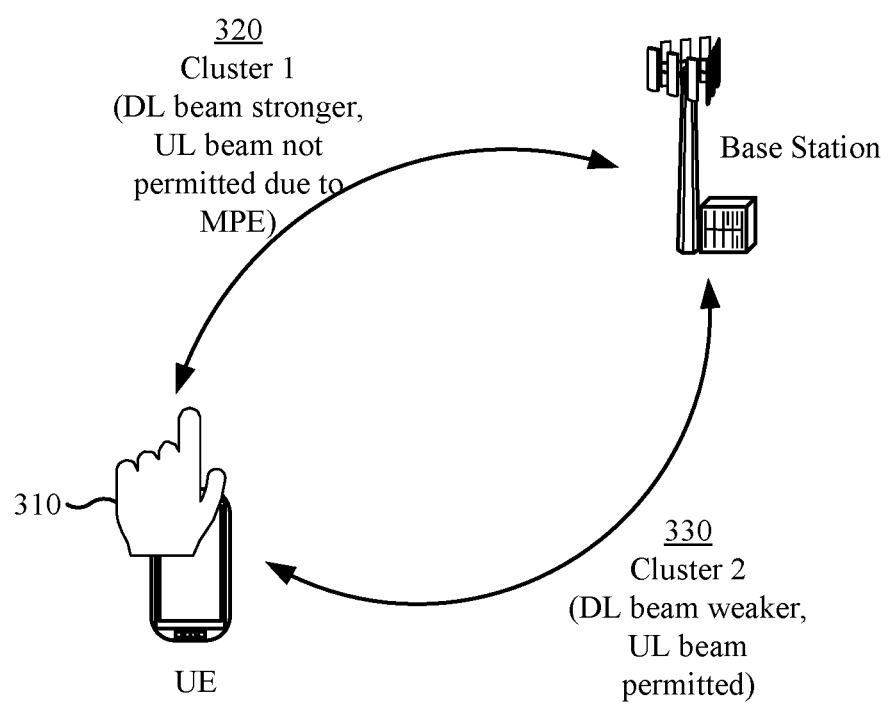
FIG. 3 illustrates uplink beam selection in millimeter wave subject to maximum permissible exposure constraints.

FIG. 3 illustrates uplink beam selection in millimeter wave subject to maximum permissible exposure constraints. As illustrated, a UE and a base station may be capable of communicating via one or more beams, and a communication via a beam may take multiple different paths, shown as a cluster of paths, to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications. To improve safety, some governing bodies have placed restrictions on the peak EIRP that can be directed toward the human body. These restrictions are sometimes referred to as maximum permissible exposure (MPE) limitations, MPE constraints, and/or the like.

As illustrated, in some aspects, an MPE condition may be due to a hand blocking scenario, where a hand 310 of a user of the UE blocks or obstructs communications to and/or from an antenna subarray of the UE, or is otherwise positioned near the antenna subarray. Additionally, or alternatively, the MPE condition may be due to the position of another body part of the user, such as the user's face, head, ear, leg, and/or the like. When the UE is subject to an MPE condition, a downlink beam of a first cluster 320 may be suitable for use by the UE to communicate with the base station, but an uplink beam of the first cluster 320 may not be permitted for use due to the MPE condition.

An uplink beam and a downlink beam in the same cluster (e.g., the first cluster 320) may form a reciprocal beam pair, where the uplink beam is used for transmission at the UE and reception at the base station, and the downlink beam is used for transmission at the base station and reception at the UE. In a reciprocal beam pair, the uplink beam and the downlink beam may be in the same direction or path (e.g., with energy radiating in a particular direction or path more than other directions or paths), but communications on the uplink beam may propagate in a different direction as communications on the downlink beam. Further, electrical characteristics of an antenna used to transmit and receive communications via a reciprocal beam pair may be the same, such as gain, radiation pattern, impedance, bandwidth, resonant frequency, polarization, and/or the like, regardless of whether the antenna is transmitting or receiving, due to the reciprocity theorem of electromagnetics.

As indicated above, when the UE is subject to an MPE condition, a downlink beam of a reciprocal beam pair may be suitable for use by the UE to receive communications from the base station, and may have better beam conditions (e.g., a stronger beam) as compared to other downlink beams, but an uplink beam of the reciprocal beam pair may not be permitted for transmission of communications by the UE due to the MPE condition. For example, the downlink beam may not be subject to an MPE constraint because the power transmitted by the base station may be attenuated by the time the transmission reaches the UE and/or the user's hand or other body part. However, the uplink beam may be subject to an MPE constraint because the total power or power spectral density transmitted by the UE may exceed a permitted level due to the close proximity of the UE and the user's hand or other body part.

It may be beneficial for the UE and/or the base station to use a first beam for uplink communications and a second beam for downlink communications, where the first beam (e.g., a UE uplink beam or a BS uplink beam) does not form a reciprocal beam pair with the second beam (e.g., a UE downlink beam or a BS downlink beam). In some aspects, the UE may select non-reciprocal UE beams to communicate with the base station even if the base station is using reciprocal BS beams to communicate with the UE. For example, the UE uplink beam may be included in a second cluster 330 and the UE downlink beam may be included in the first cluster 320 (e.g., even if the base station is using a BS uplink beam and a BS downlink beam that are both included in the first cluster 320). The UE uplink beam may form a reciprocal beam pair with a UE downlink beam in the second cluster 330 that is weaker than and/or has less suitable beam conditions than the UE downlink beam in the first cluster 320. By choosing distinct UE uplink and UE downlink beams, the UE may improve performance while satisfying an MPE constraint.

Additionally, or alternatively, the base station may select non-reciprocal BS beams, such that a UE uplink beam, used to transmit communications to the base station 110 (e.g., and received at the base station via a BS uplink beam), has a reduced MPE impact at the UE as compared to a BS uplink beam that forms a reciprocal beam pair with the BS downlink beam that has the best or better performance. In some aspects, the UE may report different metrics to facilitate the selection of the BS uplink beam and/or the BS downlink beam. Additional details regarding beam selection are described below.

Figure 4:
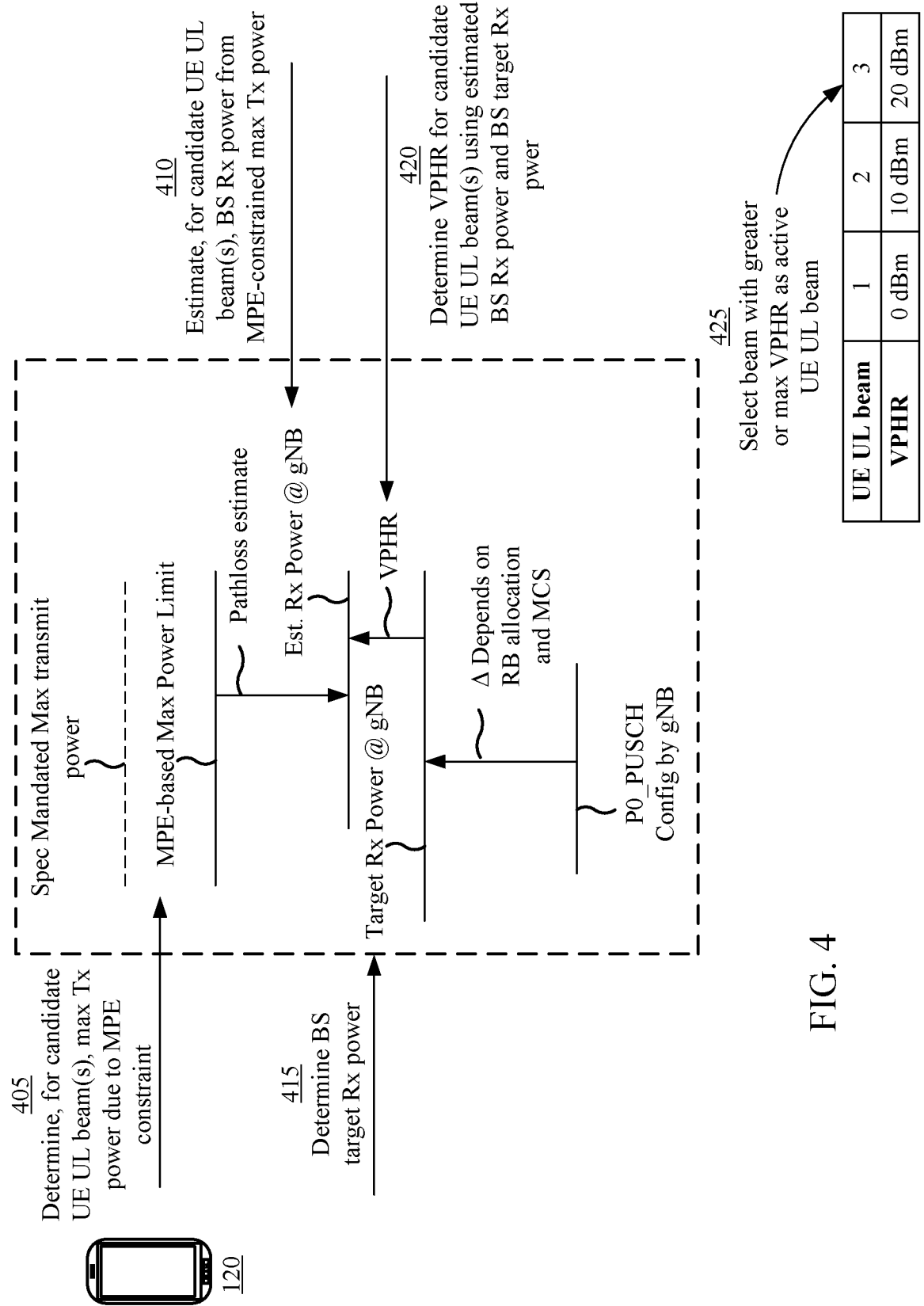
FIG. 4 illustrates uplink beam selection in millimeter wave subject to maximum permissible exposure constraints, in accordance with various aspects of the present disclosure.

FIG. 4 illustrates uplink beam selection in millimeter wave subject to maximum permissible exposure constraints, in accordance with various aspects of the present disclosure. As illustrated at operation 405, a UE 120 may determine, for a candidate UE uplink beam, a maximum transmit power due to a maximum permissible exposure (MPE) constraint (e.g., an MPE limitation, an MPE restriction, and/or the like), shown in FIG. 4 as an MPE-based maximum power limit. As used herein, the maximum transmit power due to the MPE constraint may be referred to as an MPE-constrained maximum transmit power. In some aspects, the MPE-constrained maximum transmit power for a candidate UE uplink beam may vary over time due to, for example, movement of the UE 120, rotation of the UE 120, and/or the like. Thus, the UE 120 may determine the MPE-constrained maximum transmit power for a candidate UE uplink beam at a specific time, for a specific time period, and/or the like.

As illustrated, in some aspects, the MPE-constrained maximum transmit power may be less than a maximum transmit power for the UE 120 when not subject to an MPE constraint (e.g., a maximum transmit power due to a class of the UE 120, a specification-mandated maximum transmit power indicated in a wireless communication standard, and/or the like). For example, when the candidate UE uplink beam is subject to an MPE constraint (e.g., due to the candidate UE uplink beam being directed toward a body), then the MPE-constrained maximum transmit power for the candidate UE uplink beam may be less than the maximum transmit power for the UE 120. However, in some aspects, the MPE-constrained maximum transmit power may be equal to a maximum transmit power for the UE 120 when not subject to an MPE constraint. For example, when the candidate UE uplink beam is not subject to an MPE constraint (e.g., due to the candidate UE uplink beam not being directed toward a body), then the MPE-constrained maximum transmit power for the candidate UE uplink beam may be equal to the maximum transmit power for the UE 120.

In some aspects, the UE 120 may determine the MPE-constrained maximum transmit power for a candidate UE uplink beam based at least in part on an EIRP value for the candidate UE uplink beam, a maximum or peak transmit power value stored by the UE 120 (e.g., as dictated by a governing body, as specified in a wireless communication standard, as configured for the UE 120, and/or the like), a determination of whether the candidate UE uplink beam is directed toward a body (e.g., a human body), and/or the like. For example, if the candidate UE uplink beam is not directed toward a body, then the UE 120 may set the MPE-constrained maximum transmit power to a maximum transmit power value for the UE 120, which may be stored by the UE 120, may be determined based at least in part on a class of the UE 120, may be specified by a wireless communication standard, and/or the like. However, if the candidate UE uplink beam is directed toward a body, then the UE 120 may set the MPE-constrained maximum transmit power based at least in part on a determined transmit power value for the candidate UE uplink beam and/or a maximum permitted EIRP value.

As illustrated, at operation 410, the UE 120 may estimate, for the candidate UE uplink beam, a receive power for a base station (e.g., an estimated BS receive power) based at least in part on the MPE-constrained maximum transmit power. In some aspects, the UE 120 may estimate the BS receive power using the MPE-constrained maximum transmit power, a path loss estimate (e.g., for transmissions from the UE 120 to the base station 110), and/or the like. In some aspects, the UE 120 may estimate the path loss after accounting for antenna array gains for the UE 120 and/or the base station 110 with respect to the candidate UE uplink beam, after accounting for beamforming for the candidate UE uplink beam, and/or the like.

As illustrated, at operation 415, the UE 120 may determine a target receive power for the base station (e.g., a target BS receive power). In some aspects, the UE 120 may determine the target BS receive power based at least in part on one or more parameters configured by the base station 110 and/or indicated to the UE 120 by the base station 110. For example, the UE 120 may estimate the target BS receive power based at least in part on a configured power parameter per resource block (e.g., shown as a P0_PUSCH parameter), a resource block allocation, a scaling factor associated with the resource block allocation (e.g., a scaling factor that depends on an uplink grant size), a modulation and coding scheme (MCS), a scaling factor associated with the MCS (e.g., a higher power for a higher MCS, a lower power for a lower MCS), and/or the like. In some aspects, the UE 120 may determine the target BS receive power based at least in part on an equation stored by the UE 120 and/or specified by a wireless communication standard.

As illustrated, at operation 420, the UE 120 may determine a virtual power headroom (VPHR) value for the candidate UE uplink beam. In some aspects, the VPHR value may be determined based at least in part on the estimated receive power for the base station (e.g., the estimated BS receive power) and the target receive power for the base station (e.g., the target BS receive power). For example, the VPHR may be calculated as the difference between estimated receive power for the base station and the target receive power for the base station (e.g., the estimated BS receive power minus the target BS receive power). In some aspects, the difference between the estimated BS receive power and the target BS receive power may be determined by filtering multiple samples (e.g., estimates, targets, and/or the like) over a time period.

Stated another way, the VPHR may be based at least in part on the MPE-constrained maximum transmit power, a path loss estimate, and the target BS receive power (e.g., the MPE-constrained maximum transmit power minus the path loss estimate minus the target BS receive power). In some aspects, the VPHR may be represented in units of decibels per milliwatt (e.g., decibel-milliwatts, or dBm).

As illustrated, at operation 425, the UE 120 may select a candidate UE uplink beam, from a plurality of candidate UE uplink beams, based at least in part on respective VPHR values determined for each of the plurality of candidate UE uplink beams. The selected candidate UE uplink beam may be used by the UE 120, as an active UE uplink beam, to communicate with the base station 110 (e.g., to transmit information on one or more channels, such as a physical uplink control channel (PUCCH), a physical uplink shared channel (PUSCH), a random access channel (RACH), and/or the like). In some aspects, the UE 120 may select the candidate UE uplink beam that has the maximum VPHR value as compared to VPHR values of other candidate UE uplink beams (e.g., all other candidate UE uplink beams). Stated another way, the UE 120 may select the candidate UE uplink beam that has the maximum difference between an estimated BS receive power and a target BS receive power as compared to the respective differences determined for other candidate UE uplink beams (e.g., all other candidate UE uplink beams).

For example, in FIG. 4, candidate UE uplink beam 1 is shown as having a VPHR value of 0 dBm, candidate UE uplink beam 2 is shown as having a VPHR value of 10 dBm, and candidate UE uplink beam 3 is shown as having a VPHR value of 20 dBm. In this case, the UE 120 may select candidate UE uplink beam 3 as the active UE uplink beam to be used to transmit communications to the base station 110 (e.g., regardless of whether the selected candidate UE uplink beam corresponds to a BS uplink beam being used by the BS to receive communications from the UE 120). In this way, the UE 120 may take MPE constraints into account when selecting the candidate UE uplink beam as the active UE uplink beam, thereby selecting the best candidate UE uplink beam that satisfies safety requirements. Furthermore, the UE 120 may be capable of maintaining a link for uplink communications despite a scenario with a severe MPE constraint.

Example Techniques for Reducing Number of Antenna Elements for Uplink Transmission As described herein, millimeter wave (mmW) channels generally suffer from high propagation loss. This loss is countered by the use of beamforming at both a user equipment (UE) (e.g., the UE 120) and a gNB (e.g., BS 110). The UE has freedom to choose its beams in order to improve reception of the gNB's signal at the UE in downlink (DL), and to improve reception of the UE signal at the gNB during uplink (UL). Typically, the UE is expected to use the beam with the maximum number of antenna elements to achieve maximum beamforming gain. However, the downside of always using the maximum number of antenna elements is that the UE power consumption increases with the maximum number of antenna elements. Moreover, if the UE transmit power is low and approaches the thermal noise power level of the radio frequency (RF) components, then the transmit performance (e.g., error vector magnitude (EVM)) may deteriorate if many elements are used. Thus, in certain aspects of the present disclosure, when the UE estimated UL link budget is favorable, the UE may reduce the number of antenna elements used for UL transmission.

Figure 5:
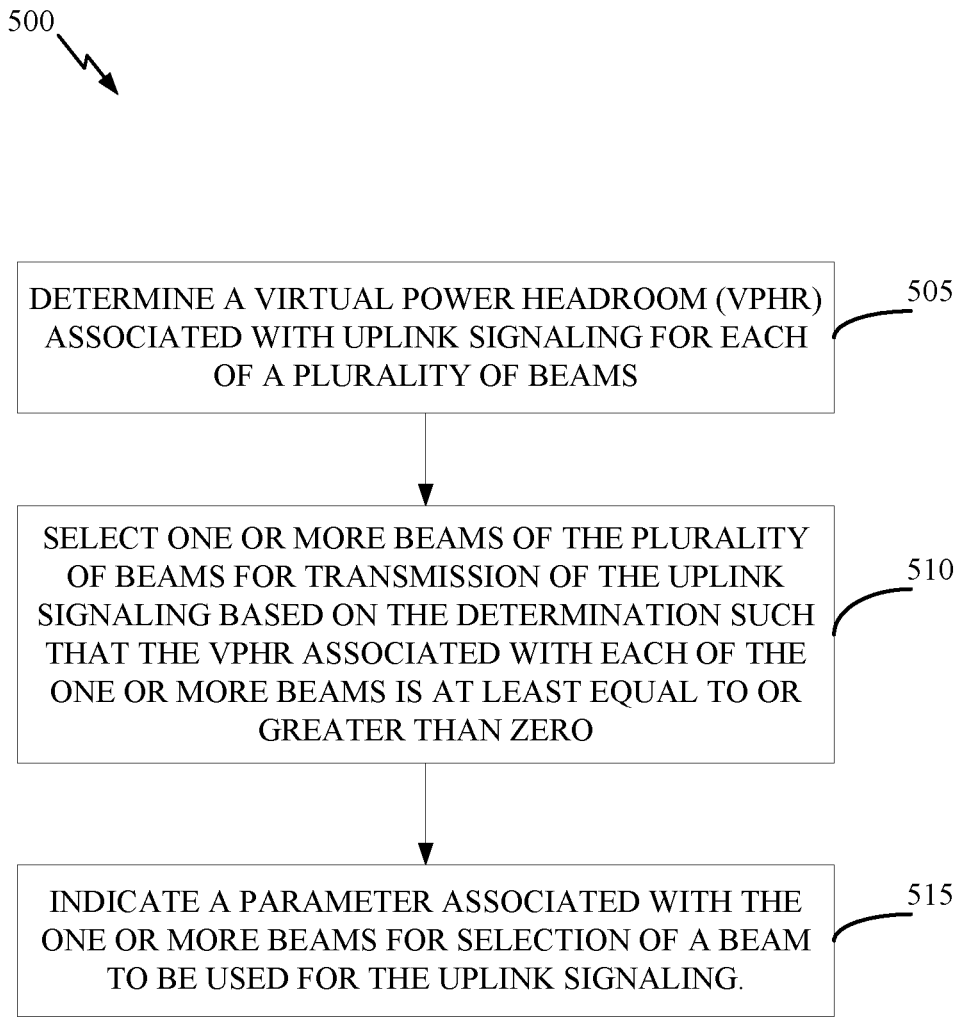
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by determining (e.g., estimating) a virtual power headroom (VPHR) associated with uplink transmission for each of a plurality of beams, and at block 510, selecting one or more beams of the plurality of beams for the uplink transmission based on the determination such that the VPHR associated with each of the one or more beams is at least equal to or greater than zero. For example, the VPHR associated with each of the one or more beams may be less than a maximum VPHR associated with the plurality of beams.

At block 515, the UE (e.g., a beam selection module of the UE) may indicate (e.g., to a consolidation module) a parameter associated with the one or more beams for selection of a beam to be used for the uplink transmission. For example, the UE may use the determined VPHR to decide a quantity of antenna elements to be used for UL transmission. That is, the operations 500 may further include determining which of the one or more beams has the lowest quantity of antenna elements, where the indicated parameter includes an indication of a quantity of antenna elements associated with the determined beam. In some cases, if another beam to be used for downlink transmission is to be the same as the beam to be used for the uplink transmission, then the indicated quantity of the antenna elements may correspond to a quantity of antenna elements of one of the beam for the uplink transmission or the other beam for the downlink transmission having the highest quantity of antenna elements.

In certain aspects, indicating the parameter associated with the one or more beams may include indicating one or more identifiers of the one or more beams. In some cases, the operations 500 may further include selecting the beam for the uplink transmission to meet one or more transmission requirements associated with the uplink transmission (e.g., by a consolidation module, as described herein).

In some cases, the operations 500 may also include filtering (e.g., using a moving average filter) the VPHR over time for each of the one or more beams, the selection of the one or more beams being based on the filtered version of the VPHR, as described in more detail herein. In some cases, the determination at block 505 and the selection at block 510 may be repeated to determine another parameter associated with one or more beams, the other parameter only being indicated for selection of a beam to be used for uplink transmission if a preset time period has elapsed since the indication of the parameter. In some cases, the other parameter may only be indicated for selection of a beam to be used for uplink transmission if a difference between the parameter and the other parameter is greater than a threshold. In some cases, the other parameter may only be indicated for selection of a beam to be used for uplink transmission if a difference between the VPHR and another VPHR associated with the other parameter is greater than a threshold, as described in more detail herein.

Figure 6:
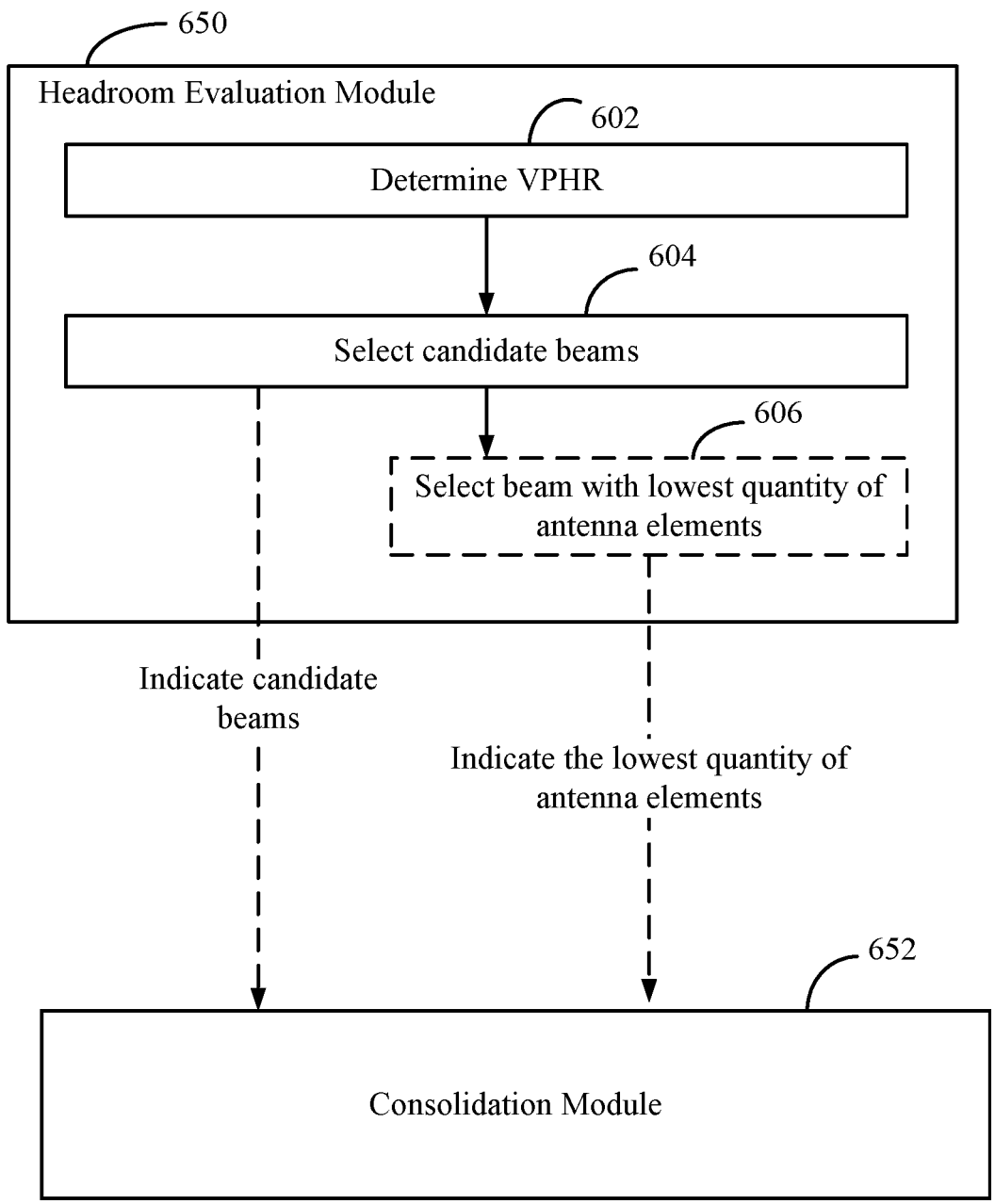
FIG. 6 illustrates various modules for performing operations for selecting a beam for uplink signaling, in accordance with certain aspects of the present disclosure.

FIG. 6 illustrates various modules for performing operations for selecting a beam for uplink transmission, in accordance with certain aspects of the present disclosure. For example, at block 602, an evaluation module 650 of the UE 120 may estimate the VPHR for all or a subset of UE beams associated with the uplink transmission. For instance, as described with respect to FIG. 4, the VPHR may be selected based on network configured parameters, such as P0_PUSCH, a quantity of resource blocks (RBs) across component carriers (CCs), a quantity of the CCs, a modulation coding scheme (e.g., Delta_MCS), or any combination thereof. The VPHR may also be selected based on UE measured parameters, such as the Pmax_dBm (e.g., a maximum permissible exposure (MPE)-based maximum power limit described with respect to FIG. 4), path loss, or one or more design parameters. In some cases, the one or more design parameters may include a constant margin term which may replace an otherwise network (e.g., BS) configured closed-loop power control term. In some aspects, the UE may receive, from the BS, multiple closed-loop power control terms. The UE may then process (e.g., filter and quantize) the closed-loop power control terms to determine the one or more design parameters to be used. Once the VPHR is estimated, at block 604, the evaluation module 650 may determine a subset of UE beams (e.g., candidate beams) associated with a positive VPHR. For instance, instead of being limited to select the beams corresponding to a maximum VPHR to increase beamforming gain, the UE may select all beams that have a VPHR that is equal to or greater than zero. The evaluation module 650 may indicate the subset of beams to a consolidation module 652 for selection of a beam for uplink transmission based on one or more other considerations. For instance, the consolidation module 652 may consider one or more requirements associated with the uplink transmission for the selection of one of the candidate beams for the uplink transmission. In some cases, at block 606, amongst this subset of UE beams, the evaluation module 650 may select the beam with the minimum quantity of antenna elements, and output the quantity of antenna elements associated with the beam to the consolidation module 652 for consideration when selecting the beam for uplink transmission.

In certain aspects, the consolidation module 652 may select a beam for uplink transmission based on one or more considerations. For instance, the consolidation module 652 may select a beam having a lower quantity of transmit beam elements when the transmit power is low in order to prevent (or at least reduce the likelihood of) deterioration in transmission performance (e.g., EVM) when many antenna elements are used. For instance, usage of a single beam may be enforced to meet a target EVM at a low power region of a mmW transmission. In some cases, the consolidation module 652 may implement a fail-safe mechanism to ensure a target transmission performance is met, even if the quantity of antenna elements indicated by the evaluation module 650 is higher (e.g., due to the network controlled parameters described herein) than a quantity of antenna elements (e.g., a single antenna element) that would otherwise be selected for lower power transmissions.

In some cases, if the UE is to use the same beam for both UL and DL (e.g., for beam correspondence), then the quantity of antenna elements may be at the maximum associated with the beam for the UL and DL. In other words, the beam to be used for both UL and DL may be associated with different antenna elements for UL and DL communications. Therefore, the quantity of the antenna elements to be used may be set to be the higher of the quantity of antenna elements associated with the beam for the UL and DL communications.

In certain aspects, VPHR may be filtered over time for each beam or subset of beams. For example, a moving average filter of estimated VPHRs may be implemented. In this case, the selection of the candidate beams may be based on the filtered version of the VPHR. In some cases, a minimum time between changes in the output of the headroom evaluation module 650 may be constrained. For instance, the output from the evaluation module 650 may change only if the new value is sustained for a set time period. This may be done to avoid rapid changes in the output resulting in rapid reevaluations of the beam to be used for uplink transmission. In some cases, a new output may be sent only if a difference between the new output (e.g., lowest quantity of antenna elements) and the previous output (e.g., previously determined lowest quantity of antenna elements) is greater than a threshold, or only if a difference between the previous VPHR estimate and a current VPHR estimate is greater than a threshold.

Figure 7:
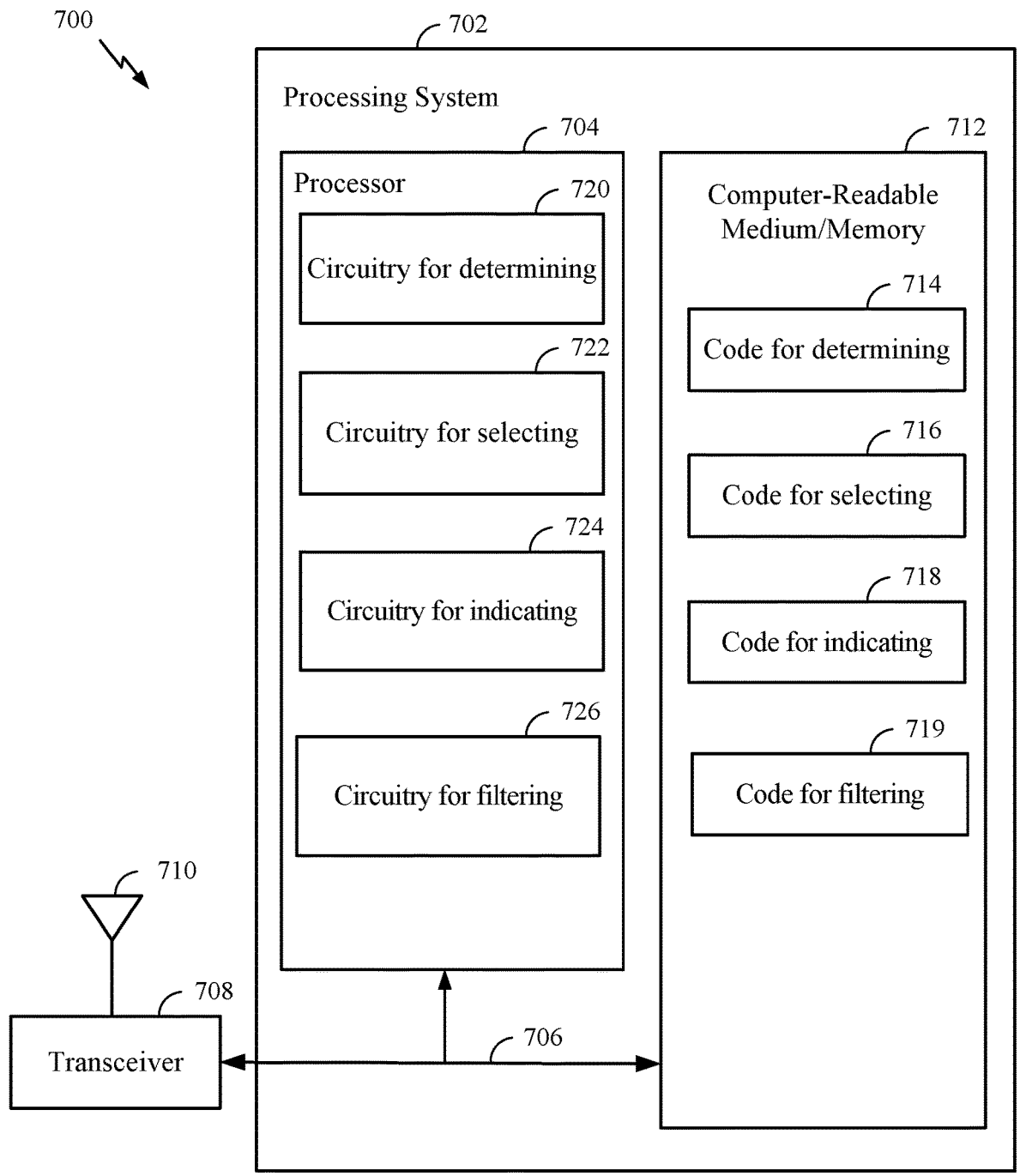
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700. The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for uplink beam selection. In certain aspects, computer-readable medium/memory 712 stores code 714 for determining (e.g., determining a VPHR); code 716 for selecting (e.g., selecting one or more beams); and code 718 for indicating (e.g., indicating a parameter for selection of a beam). In some aspects, the computer-readable medium/memory 712 may optionally store code 719 for filtering. In certain aspects, the processor 704 has circuitry configured to implement the code stored in the computer-readable medium/memory 712. The processor 704 includes circuitry 720 for determining (e.g., determining a VPHR); circuitry 722 for selecting (e.g., selecting one or more beams); and circuitry 724 for indicating (e.g., indicating a parameter for selection of a beam). In some aspects, the processor 704 may optionally include circuitry 726 for filtering.

Example Aspects

Aspect 1: A method for wireless communication at a user equipment (UE), comprising determining a virtual power headroom (VPHR) associated with uplink transmission for each of a plurality of beams, selecting one or more beams of the plurality of beams for the uplink transmission based on the determination such that the VPHR associated with each of the one or more beams is at least equal to or greater than zero, and indicating a parameter associated with the one or more beams for selection of a beam to be used for the uplink transmission.

Aspect 2. The method of Aspect 1, wherein the VPHR comprises a difference between an estimated receive power of the uplink transmission and a target receive power of the uplink transmission.

Aspect 3: The method of Aspect 1 or 2, wherein the VPHR associated with each of the one or more beams is less than a maximum VPHR associated with the plurality of beams.

Aspect 4: The method of any of Aspects 1-3, further comprising determining which of the one or more beams has the lowest quantity of antenna elements, wherein the indicated parameter comprises an indication of a quantity of antenna elements associated with the determined beam of the one or more beams.

Aspect 5: The method of Aspect 4, wherein, if another beam to be used for downlink transmission is to be the same as the beam to be used for the uplink transmission, the indicated quantity of the antenna elements corresponds to a quantity of antenna elements of one of the beam for the uplink transmission and the other beam for the downlink transmission having the highest quantity of antenna elements.

Aspect 6: The method of any of Aspects 1-5, wherein indicating the parameter associated with the one or more beams comprises indicating one or more identifiers of the one or more beams.

Aspect 7: The method of any of Aspects 1-6, further comprising selecting the beam for the uplink transmission to meet one or more transmission requirements associated with the uplink transmission.

Aspect 8: The method of any of Aspects 1-7, wherein the VPHR is determined based on at least one of: one or more network configured parameters, one or more UE measured parameters, or one or more design parameters at the UE.

Aspect 9: The method of Aspect 8, wherein the one or more network configured parameters comprises at least one of a power per resource block (RB) parameter, a quantity of RBs across component carriers (CCs) to be used for the uplink transmission, a quantity of the CCs, or a modulation coding scheme (MCS) to be used for the uplink transmission.

Aspect 10: The method of Aspect 8 or 9, wherein the one or more UE measured parameters comprises at least one of a path loss associated with the uplink transmission or a maximum permissible exposure (MPE)-based power limit.

Aspect 11: The method of any of Aspects 8-10, further comprising receiving, from a base station, closed-loop power control terms, and processing the closed loop power control terms to determine the one or more design parameters.

Aspect 12: The method of Aspect 11, wherein the processing comprises filtering and quantizing the closed-loop power control terms.

Aspect 13: The method of any of Aspects 1-12, further comprising filtering the VPHR over time for each of the one or more beams, the selection of the one or more beams being based on the filtered version of the VPHR.

Aspect 14: The method of any of Aspects 1-13, wherein the determination and the selection are repeated to determine another parameter associated with one or more beams, the other parameter being indicated for selection of a beam to be used for uplink transmission if a preset time period has elapsed since the indication of the parameter.

Aspect 15: The method of any of Aspects 1-14, wherein the determination and the selection are repeated to determine another parameter associated with one or more beams, the other parameter being indicated for selection of a beam to be used for uplink transmission if a difference between the parameter and the other parameter is greater than a threshold.

Aspect 16: The method of any of Aspects 1-15, wherein the determination and the selection are repeated to determine another parameter associated with one or more beams, the other parameter being indicated for selection of a beam to be used for uplink transmission if a difference between the VPHR and another VPHR associated with the other parameter is greater than a threshold.

Aspect 17: An apparatus for wireless communication at a user equipment (UE), comprising a memory and a processing system coupled to the memory and configured to perform one or more of the methods of Aspects 1-16.

Aspect 18: An apparatus for wireless communication at a user equipment UE, comprising one or more means for performing one or more of the methods of Aspects 1-16.

Aspect 19: A computer readable medium having code stored thereon to cause one or more processors to perform one or more of the methods of Aspects 1-16.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communication at a user equipment (UE), comprising:
   determining a virtual power headroom (VPHR) associated with uplink transmission for each of a plurality of beams;
   selecting one or more beams of the plurality of beams for the uplink transmission based on the determination such that the VPHR associated with each of the one or more beams is at least equal to or greater than zero;
   determining which of the one or more beams has the lowest quantity of antenna elements; and
   communicating with a network node based on the determined beam of the plurality of beams for the uplink transmission.

2. The method of claim 1, wherein the VPHR comprises a difference between an estimated receive power of the uplink transmission and a target receive power of the uplink transmission.

3. The method of claim 1, wherein the VPHR associated with each of the one or more beams is less than a maximum VPHR associated with the plurality of beams.

4. The method of claim 1, wherein the indicated parameter comprises an indication of a quantity of antenna elements associated with the determined beam of the one or more beams.

5. The method of claim 1, wherein, if another beam to be used for downlink transmission is to be the same as the beam to be used for the uplink transmission to the network node, the indicated quantity of the antenna elements corresponds to a quantity of antenna elements of one of the beam for the uplink transmission and the other beam for the downlink transmission having the highest quantity of antenna elements.

6. The method of claim 1, wherein indicating the parameter associated with the one or more beams comprises indicating one or more identifiers of the one or more beams.

7. The method of claim 1, further comprising selecting the beam for the uplink transmission to meet one or more transmission requirements associated with the uplink transmission.

8. The method of claim 1, wherein the VPHR is determined based on at least one of:
   one or more network configured parameters;
   one or more UE measured parameters; or
   one or more design parameters at the UE.

9. The method of claim 8, wherein the one or more network configured parameters comprises at least one of a power per resource block (RB) parameter, a quantity of RBs across component carriers (CCs) to be used for the uplink transmission, a quantity of the CCs, or a modulation coding scheme (MCS) to be used for the uplink transmission.

10. The method of claim 8, wherein the one or more UE measured parameters comprises at least one of a path loss associated with the uplink transmission or a maximum permissible exposure (MPE)-based power limit.

11. The method of claim 8, further comprising:
   receiving, from a base station, closed-loop power control terms; and
   processing the closed loop power control terms to determine the one or more design parameters.

12. The method of claim 11, wherein the processing comprises filtering and quantizing the closed-loop power control terms.

13. The method of claim 1, further comprising filtering the VPHR over time for each of the one or more beams, the selection of the one or more beams being based on the filtered version of the VPHR.

14. The method of claim 1, wherein the determination and the selection are repeated to determine another parameter associated with one or more beams, the other parameter being indicated for selection of a beam to be used for uplink transmission if a preset time period has elapsed since the indication of the parameter.

15. The method of claim 1, wherein the determination and the selection are repeated to determine another parameter associated with one or more beams, the other parameter being indicated for selection of a beam to be used for uplink transmission if a difference between the parameter and the other parameter is greater than a threshold.

16. The method of claim 1, wherein the determination and the selection are repeated to determine another parameter associated with one or more beams, the other parameter being indicated for selection of a beam to be used for uplink transmission if a difference between the VPHR and another VPHR associated with the other parameter is greater than a threshold.

17. An apparatus for wireless communication at a user equipment (UE), comprising:
   a memory; and
   a processing system coupled to the memory and configured to:
     determine a virtual power headroom (VPHR) associated with uplink transmission for each of a plurality of beams;
     select one or more beams of the plurality of beams for the uplink transmission based on the determination such that the VPHR associated with each of the one or more beams is at least equal to or greater than zero; and determine which of the one or more beams has the lowest quantity of antenna elements; and communicate with a network node based on the determined beam of the plurality of beams for the uplink transmission.

18. The apparatus of claim 17, wherein the VPHR comprises a difference between an estimated receive power of the uplink transmission and a target receive power of the uplink transmission.

19. The apparatus of claim 17, wherein the VPHR associated with each of the one or more beams is less than a maximum VPHR associated with the plurality of beams.

20. The apparatus of claim 17, wherein the indicated parameter comprises an indication of a quantity of antenna elements associated with the determined beam of the one or more beams.

21. The apparatus of claim 17, wherein, if another beam to be used for downlink transmission is to be the same as the beam to be used for the uplink transmission to the network node, the indicated quantity of the antenna elements corresponds to a quantity of antenna elements of one of the beam for the uplink transmission and the other beam for the downlink transmission having the highest quantity of antenna elements.

22. The apparatus of claim 17, wherein indicating the parameter associated with the one or more beams comprises indicating one or more identifiers of the one or more beams.

23. The apparatus of claim 17, wherein the processing system is further configured to select the one or more beams for the uplink transmission to meet one or more transmission requirements associated with the uplink transmission.

24. The apparatus of claim 17, wherein the VPHR is determined based on at least one of:
one or more network configured parameters;
one or more UE measured parameters; or
one or more design parameters at the UE.

25. The apparatus of claim 24, wherein the one or more network configured parameters comprises at least one of a power per resource block (RB) parameter, a quantity of RBs across component carriers (CCs) to be used for the uplink transmission, a quantity of the CCs, or a modulation coding scheme (MCS) to be used for the uplink transmission.

26. The apparatus of claim 24, wherein the one or more UE measured parameters comprises at least one of a path loss associated with the uplink transmission or a maximum permissible exposure (MPE)-based power limit.

27. The apparatus of claim 24, wherein the processing system is further configured to:
receive, from a base station, closed-loop power control terms; and
process the closed loop power control terms to determine the one or more design parameters.

28. The apparatus of claim 27, wherein the processing comprises filtering and quantizing the closed-loop power control terms.

29. An apparatus for wireless communication at a user equipment (UE), comprising:
means for determining a virtual power headroom (VPHR) associated with uplink transmission for each of a plurality of beams;
means for selecting one or more beams of the plurality of beams for the uplink transmission based on the determination such that the VPHR associated with each of the one or more beams is at least equal to or greater than zero;
means for determining which of the one or more beams has the lowest quantity of antenna elements; and
means for communicating with a network node based on the determined beam of the plurality of beams for the uplink transmission.

30. A non-transitory computer readable medium having code stored thereon to cause one or more processors to:
determine a virtual power headroom (VPHR) associated with uplink transmission for each of a plurality of beams;
select one or more beams of the plurality of beams for the uplink transmission based on the determination such that the VPHR associated with each of the one or more beams is at least equal to or greater than zero;
determine which of the one or more beams has the lowest quantity of antenna elements; and
communicate with a network node based on the determined beam for the uplink transmission.

* * * * *